Nov. 30, 1926.

A. J. FARMER

DETACHABLE SIGN

Filed Feb. 7, 1925

1,608,651

A. J. Farmer
INVENTOR

BY Victor J. Evans
ATTORNEY

WITNESS:

Patented Nov. 30, 1926.

1,608,651

UNITED STATES PATENT OFFICE.

ARTHUR J. FARMER, OF CHICAGO, ILLINOIS.

DETACHABLE SIGN.

Application filed February 7, 1925. Serial No. 7,612.

This invention relates to improvements in signs especially adapted for vehicles, an object being to provide means whereby a sign may be attached to an automobile and readily removed and replaced, so that the sign may be displayed when the automobile is used for business purposes and removed or reversed when the automobile is used for pleasure.

Another object of the invention is the provision of means for securing the sign in position which will not present an unsightly appearance when the sign is removed.

Another object of the invention is the provision of sign attaching means which, in addition to the above and other advantages, is simple and cheap in construction and may be readily attached to an automobile.

With the above and other objects in view, the invention further includes the following novel features and details of construction, to be hereinafter more fully described, illustrated in the accompanying drawings and pointed out in the appended claim.

In the drawings:—

Figure 1:
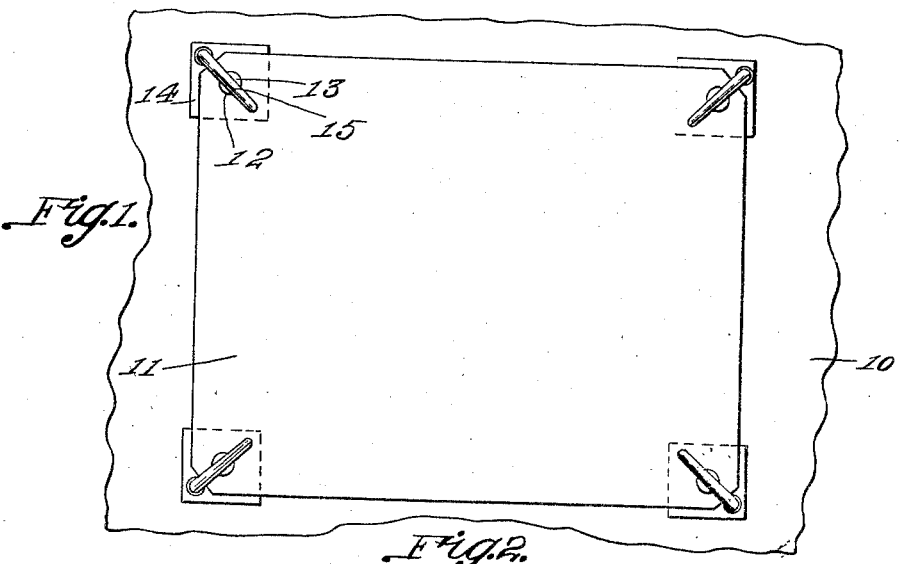
Figure 1 is an elevation showing a fragmentary portion of an automobile or other supporting means with the invention applied.
Figure 2:
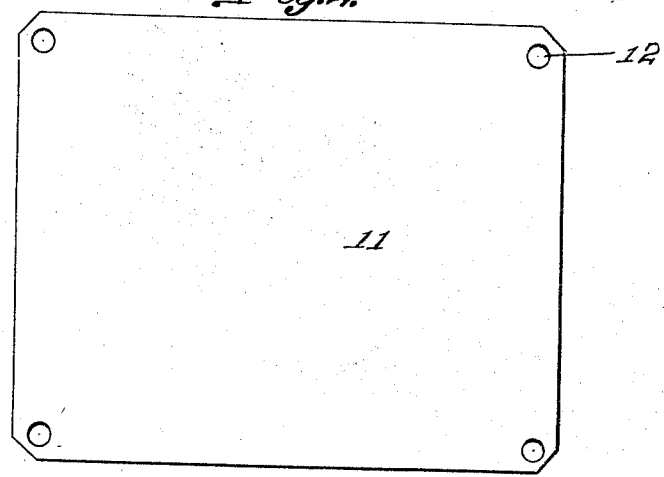
Figure 2 is an elevation of the sign per se.

Referring to the drawings in detail wherein like characters of reference denote corresponding parts, the reference character 10 indicates a fragmentary portion of the side of an automobile to which the sign is applied. The sign comprises a panel 11 which may have upon either one or both sides suitable advertising matter. This panel is provided at each corner with an opening 12 for the reception of lugs 13 which form a part of the sign attaching members.

Figure 3:
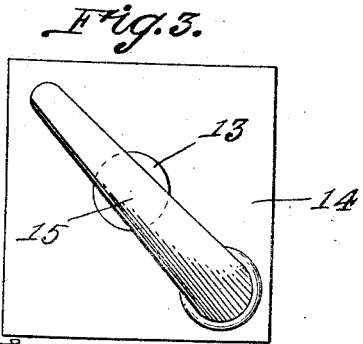
Figure 3 is a detail elevation of one of the attaching devices.
Figure 4:
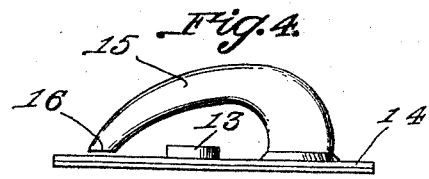
Figure 4 is an edge view of the same.

The sign attaching members are illustrated in detail in Figures 3 and 4 of the drawings and each comprises a base 14 to the rear face of which a suitable cement or adhesive may be applied for the purpose of attaching the base to the automobile. The lug 13 extends from the base approximately central thereof and extending from one corner of the base is a curved arm 15 whose free end 16 is slightly spaced from the outer face of the base.

The attaching members are preferably made of a relatively flexible rubber and are designed to be cemented in place so that the corners of the sign may be placed beneath the free ends of the arms 15 with the studs or lugs 13 inserted within the openings 12. The free end 16 of the arms 15 will then rest against the face of the sign and hold the latter in position. Due to the flexibility of the arms 15, the latter may be readily flexed for the removal and replacement of the sign.

The sign may be placed in position for use when the automobile is being used for business purposes and may be reversed with the blank side out when the automobile is used for pleasure, or, the panel 11 may be entirely removed.

The invention is susceptible of various changes in its form, proportions and minor details of construction and the right is herein reserved to make such changes as properly fall within the scope of the appended claim.

Having described the invention what is claimed is:—

In a detachable sign, a panel having openings in the corners thereof, an attaching member for each corner, each member comprising an attaching base, a lug extending outwardly from the base for engagement with one of the openings of the panel and a curved yieldable arm having its outer end rigid with the attaching plate and extending over the lug with its free end in contacting engagement with the panel.

In testimony whereof I affix my signature.

ARTHUR J. FARMER.